No. 760,653. PATENTED MAY 24, 1904.
J. F. SIEMS.
THERMOSTATIC CONTROLLER.
APPLICATION FILED OCT. 18, 1902.
NO MODEL.
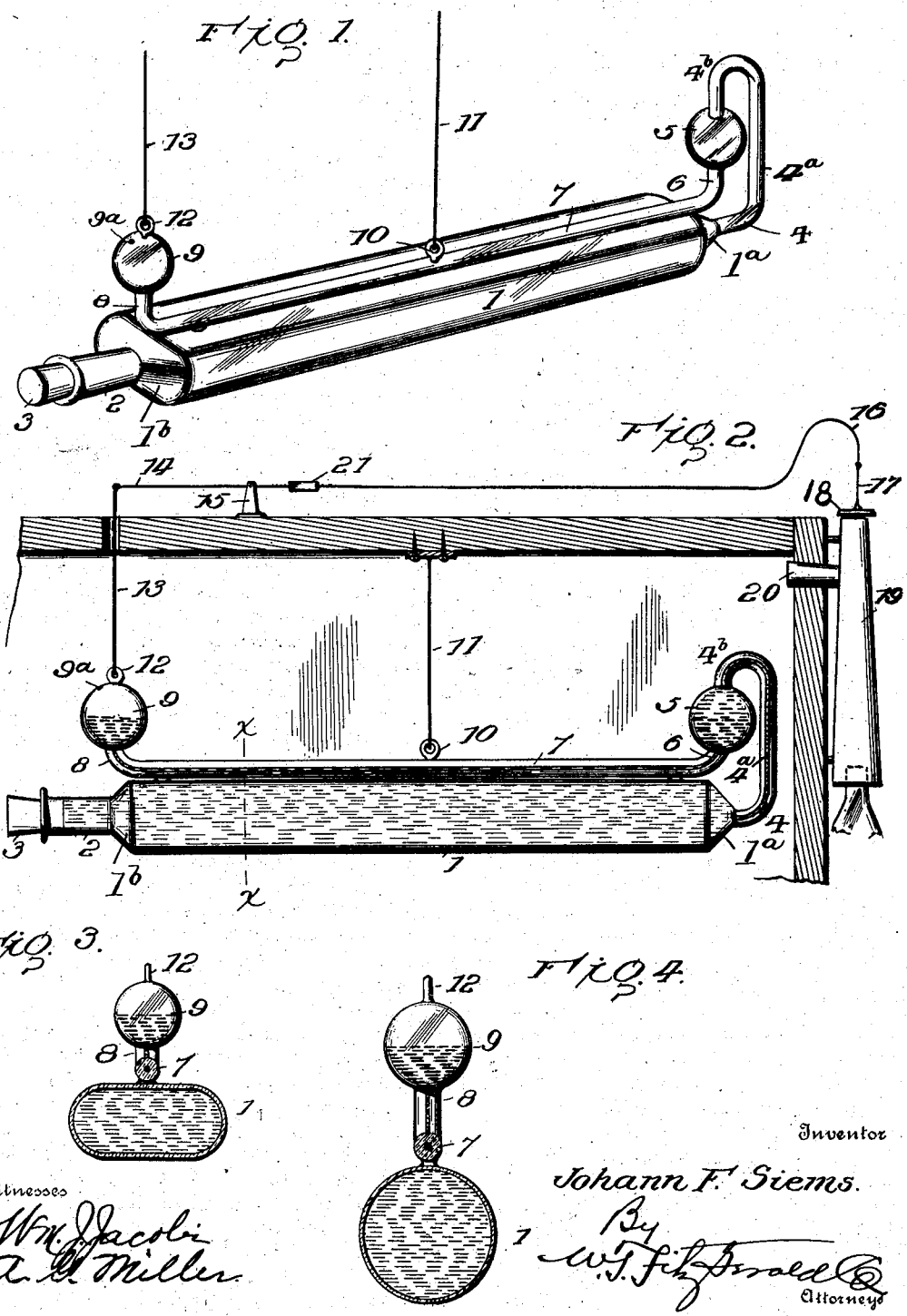

No. 760,653. Patented May 24, 1904.

UNITED STATES PATENT OFFICE.

JOHANN F. SIEMS, OF COLUMBUS, NEBRASKA.

THERMOSTATIC CONTROLLER.

SPECIFICATION forming part of Letters Patent No. 760,653, dated May 24, 1904.

Application filed October 18, 1902. Serial No. 127,854. (No model.)

*To all whom it may concern:*

Be it known that I, JOHANN F. SIEMS, a citizen of the United States, residing at Columbus, in the county of Platte and State of Nebraska, have invented certain new and useful Improvements in Thermostatic Controllers; and I do hereby declare the following to be a full, clear, and exact description of the invention, such as will enable others skilled in the art to which it appertains to make and use the same.

My present invention relates to new and useful improvements in vessels for thermostats for use in connection with incubators, brooders, and for purposes of ventilation and all other uses for which it may be adapted; and it consists of certain novel features of combination and construction of parts, as will be hereinafter fully described and claimed.

The prime object of my invention, among others, is to provide a controlling device for the damper or flue of a lamp or stove or other heating appliance which will be found at all times to be thoroughly reliable and efficient and at the same time extremely sensitive.

A further object of my invention, among others, is to place the heating apparatus under perfect and complete control, whereby any desired degree of temperature may be established and maintained with a minimum degree of variation, inasmuch as the controlling device will, as above stated, prove to be extremely sensitive in its action, and therefore instantly responsive to the slightest variation of the temperature within the incubating or brooding chamber or other place where my thermostatic controller may be employed.

Other objects and advantages of my thermostat will be hereinafter clearly set forth, and illustrated in the accompanying drawings, which are made a part of this application, and in which—

Figure 1 shows a perspective view of my invention complete ready for use. Fig. 2 shows a side elevation of my invention as applied to use upon an ordinary incubator for the purpose of controlling the damper of the heater. Fig. 3 is a transverse section of Fig. 2 on line *x x*, while Fig. 4 is a transverse section of another form of my invention wherein the alcohol-receptacle is shown to be truly cylindrical instead of being elongated, as shown in Fig. 3.

In order to conveniently refer to all of the various details of my invention and the elements deemed necessary in showing a practical application thereof to use, numerals will be employed, the same numeral applying to a similar part throughout the several views.

Referring to the numerals on the drawings, 1 indicates the tubular body portion of my thermostatic controller, which is designed to contain alcohol or other suitable liquid which is properly responsive to varying temperatures, whereby such liquid will readily expand or contract, according to the temperature surrounding the same.

The body portion 1 is preferably formed of glass, though any other suitable material may be employed, and is so formed as to have the outwardly-converging inner end $1^a$, the outwardly-converging outer end $1^b$, and the bottle-like neck or extension 2, provided with a closure or stopper 3, as it is through said neck the contents of my thermostatic controller are introduced, as will be hereinafter specifically set forth. The body portion 1 is preferably formed in transverse or cross section, as shown in Figs. 1, 2, and 3, though it will be understood that such form may be varied as desired. At the inner or opposite end of the body portion containing the neck-section 2 the said body is reduced in diameter, so as to provide a connecting-tube, having the upwardly-inclined tubular section 4 surmounted by a vertical section $4^a$, which extends upward a proper height and is then bent downward to provide a return-section $4^b$ and is enlarged so as to form the preferably spherical reservoir or bulb 5, though it will be understood that said reservoir may have any other shape deemed most suitable for the purpose. The spherical reservoir 5 also terminates in or is connected with the upwardly-directed curved branch 6 of the horizontally-disposed tube-section 7, which extends the entire length parallel with the top of the body portion 1, as presented in Figs. 1 and 2, and terminates in the upwardly-directed curved branch 8, which latter is enlarged to form the preferably spherical reservoir or bulb 9, corresponding in size with the reservoir 5.

The body portion 1 and accompanying parts hereinbefore set forth are truly balanced upon the eye projection 10, formed integral with the tubular section 7 or otherwise connected thereto at its central portion, and it is therefore obvious that my thermostatic controller when suspended upon the supporting-rod 11 will be truly balanced thereon even though when the body portion 1 is filled with alcohol or other suitable liquid and the reservoirs 5 and 9 and connecting-tubes are filled with mercury, as it is by means of said sensitive substances that movement is imparted to my controller sufficient to enable it to reliably perform its office.

By reference to Fig. 1 it will be observed that the reservoir 9 is provided upon its upper side with the eye projection or apertured extension 12, affording pivotal engagement with the controlling-rod 13, which latter extends upward into pivotal union with the lever 14, supported upon the bracket 15 and having at its extreme outer or free end the upwardly-curved branch or terminal 16, designed to pivotally connect with the stem 17 of the damper proper, 18.

The damper 18 is designed to coöperate in the usual manner with the extreme upper end of the flue 19, which is provided with the inwardly-directed branch 20, extending into the interior of the incubating or brooding chamber, as clearly shown in Fig. 2, and it is therefore clearly obvious that when the damper 18 is lowered into contact with the flue 19 the heat will be reliably directed through the branch 20 into the incubator or brooder or other point where it is desirable to conduct the same. It is further obvious that when the damper 18 is raised the heat will take the most direct course upward and pass out into the air, thereby shunting the branch 20 and leaving the interior of the incubator unsupplied with an additional flow of heat. The lever-section 14 is provided with the counterpoise 21, as is usual, said counterpoise being designed to be moved in either direction upon a threaded portion of said lever, thereby enabling a most accurate adjustment of my thermostatic controller, whereby when the slightest expansion occurs within the body portion 1 the equilibrium will be disturbed and the lever 14 operated to open or close the damper, thereby making it possible to maintain within the heat-receiving chamber any desired degree of temperature deemed most suitable and productive of the best results.

The tubular section 7 and its upwardly-curved branches 6 and 8 are provided with a comparatively small continuous bore, and said bore is completely filled with mercury, while the reservoirs 5 and 9 are each half-full, more or less, of mercury. The upper half of the reservoir 5 and the body portion 1 and the tubular connection intermediate said parts are completely filled with alcohol, while the upper half of the reservoir 9 contains air, a suitable vent $9^a$ being provided. When, therefore, the slightest expansion occurs in the contents of the body portion 1, the alcohol will be forced upward through the tubular connection 4 and will force the mercury within the lower half of the reservoir 5 downward, causing the mercury to rise in the reservoir 9, and thereby instantly disturb the equilibrium and insuring that a downward pull will be made upon the link-section 13 and elevate the damper-section 18 and cause the heat from the lamp or stove to flow directly upward and continue to so flow until the temperature is lowered in the incubating or brooding chamber.

When the temperature within the incubator shall have become lowered beyond the desired point, contraction of the alcohol or other liquid in the body portion 1 will take place, thereby causing the alcohol in the tubular branch 4 and the upper portion of the reservoir 5 to be withdrawn into the body portion 1 and incidentally permitting the excess of mercury in the reservoir 9 to move downward and thence upward into the reservoir 5, and thereby restore a true balance or equilibrium of my thermostatic controller sufficient to cause the free end of the lever-section 14 to be raised to bring the damper in contact with the upper end of the flue 19, and thereby reestablish the flow of the heat through the branch 20 into the heat-receiving chamber, this operation being continued indefinitely, and thereby making it absolutely certain that a uniform temperature within the incubating or brooding chamber will be reliably maintained.

Having thus fully described the details of construction involved in the materialization of my invention and the manner of applying the same to use, further description is deemed unnecessary.

What I claim as new, and desire to secure by Letters Patent, is—

1. A thermostatic-controller vessel formed with a horizontal tubular body having a converging outer end formed with a filling-neck and a converging inner end, a horizontal tube surmounting the tubular body parallel therewith and secured thereto having upwardly-curved outer and inner ends located over the converging outer and inner ends of the tubular body respectively, an inner bulb surmounting and connected with the curved inner end of the horizontal tube, a connecting-tube having a vertical part, a curved lower end connected with the converging inner end of the tubular body, and a doubly-curved upper end connected with the top of the inner bulb, an outer bulb surmounting and connected with the curved outer end of the horizontal tube and having a vent-hole and an integral eye at the top thereof and an eye formed integral with the horizontal tube centrally of the latter whereby the vessel is suspended.

2. A thermostatic controller comprising a horizontal body having a converging inner end, and a converging outer end provided with a filling-neck, a stopper for the filling-neck, a horizontal tube surmounting and secured to the body, having upwardly-curved ends and a centrally-arranged eye projection at the top of the tube for supporting the controller, a reservoir surmounting and formed on the inner curved end of the horizontal tube, a vertical connecting-tube having an inclined lower part connected with the inner end of the body and a downturned upper part connected with the top of the inner reservoir, a reservoir surmounting and formed on the outer curved end of the horizontal tube, having a vent-hole and an eye projection for connecting the damper mechanism, means connected with the eye projection of the horizontal tube for suspending the controller, means connected with the eye projection of the outer reservoir for controlling a damper; the body, connecting-tube and approximately one-half of the inner reservoir containing responsive liquid and the horizontal tube and approximately one-half of the reservoirs containing mercury, as set forth.

In testimony whereof I affix my signature in presence of two witnesses.

JOHANN F. SIEMS.

Witnesses:
 EVELYN PADGETT,
 GUY E. PADGETT.